United States Patent [19]

Capecchi

[11] 4,129,406
[45] Dec. 12, 1978

[54] MOLD FOR THE VULCANIZATION OR RETREADING OF VEHICLE TIRES

[75] Inventor: Floriano Capecchi, Pistoia, Italy

[73] Assignee: CIMA Costruzioni Industriali Metalmeccaniche e Affini S.A.S. di Capecchi Floriano & C., Italy

[21] Appl. No.: 858,374

[22] Filed: Dec. 7, 1977

Related U.S. Application Data

[63] Continuation-in-part of Ser. No. 740,055, Nov. 8, 1976, abandoned.

[30] Foreign Application Priority Data

Nov. 25, 1975 [IT] Italy ................................ 9626 A/75
Jul. 12, 1977 [IT] Italy ................................ 9518 A/77

[51] Int. Cl.² .......................... B29H 5/02; B29H 5/08
[52] U.S. Cl. ........................ 425/46; 425/39; 425/47
[58] Field of Search .................. 425/17, 29, 40, 43, 425/46, 47

[56] References Cited

U.S. PATENT DOCUMENTS

| | | | |
|---|---|---|---|
| 1,167,009 | 1/1916 | Nall | 425/40 |
| 1,179,898 | 4/1916 | Coffey et al. | 425/47 |
| 2,174,188 | 9/1939 | Heintz | 425/47 X |
| 2,567,985 | 9/1951 | Baker et al. | 425/40 X |
| 3,460,197 | 8/1969 | Cantarutti et al. | 425/46 |
| 3,461,502 | 8/1969 | Turk et al. | 425/29 |
| 3,464,090 | 9/1969 | Cantarutti | 425/46 X |
| 3,479,693 | 11/1969 | Cantarutti | 425/46 X |
| 3,850,555 | 1/1974 | Pasch | 425/46 |
| 3,852,006 | 12/1974 | Irie | 425/47 |

FOREIGN PATENT DOCUMENTS

| | | | |
|---|---|---|---|
| 1169118 | 4/1964 | Fed. Rep. of Germany | 425/17 |
| 1239461 | 4/1967 | Fed. Rep. of Germany | 425/46 |
| 1460404 | 10/1966 | France | 425/43 |

*Primary Examiner*—J. Howard Flint, Jr.
*Attorney, Agent, or Firm*—McGlew and Tuttle

[57] ABSTRACT

A mold base has an annular support plate secured thereto and formed with a plurality of equiangularly spaced radial slots and with an external peripheral guide groove. A support structure on the support plate carries an annular base plate mounting the lower half of a cylindrical radially inner chill whose upper half is carried by an annular closure plate. An arm on the base pivotally supports a radial arm pivotally connected to the closure plate, and a toggle linkage is connected between the base and the radial arm. An operating ring is guided in the guide groove for angular displacement by a hydraulic actuator. Radially outer chill sectors are positioned on the base plate and carried by respective die sectors guided in the radial slots of the support plate, and bent crank links connect the die sectors to the operating ring. The die sectors have beveled clamping surfaces engageable with beveled peripheries of the base and closure plates upon displacement of the operating ring in a mold closing direction. A projecting wing on the operating ring engages the toggle linkage near the end of displacement of the operating ring in the mold opening direction, to open the closure plate. The axial and radial stresses, during molding, are absorbed, respectively, by the clamping surfaces of the die sectors engaging the beveled peripheries of the base and closure plates, and by abutments on the operating ring radially aligned with respective spurs on the die sectors which engage the spurs and force the same radially inwardly upon closing of the mold, so that the mold operating components are free of stress during molding.

10 Claims, 7 Drawing Figures

MOLD FOR THE VULCANIZATION OR RETREADING OF VEHICLE TIRES

CROSS REFERENCE TO RELATED APPLICATION

This application is a continuation in part of application Ser. No. 740,055, filed Nov. 8, 1976, now abandoned, for "A MOULD FOR THE RETREADING OF TIRES OF VEHICLES".

FIELD OF THE INVENTION

This invention relates to a mold designed for the vulcanization, and especially for the re-treading or re-generation, of vehicle tires, and of the type including a mold constituted by a pluarality of radially outer chill sectors radially moveable with respect to a radially inner chill and disposed between a base plate and a closure plate, with the closure plate being raisable and with the base and closure plates being peripherally clamped against relative axial displacement by die sectors carrying the radially outer chill sectors.

More particularly, the present invention is directed to an improved mold of this type in which opening and closing of the chill and the chill sectors, and of the closure plate, as well as clamping of the base and closure plates against relative axial displacement, is effected by a simple operating means in the form of an angularly displaceable operating ring connected to die sectors carrying the radially outer chill sectors and formed with means operable to open the closure plate near the end of angular displacement of the operating ring in the mold opening direction, and in which the axial and radial stresses, during molding, are absorbed, respectively, by clamping means engageable with the base and closure plates responsive to angular displacement of the operating ring in the mold closing direction, and by cam type abutments on the operating ring engaging spurs on the die sectors to force the latter radially inwardly, whereby the mold operating components are free of stress during molding.

SUMMARY OF THE INVENTION

In accordance with the invention, the radially outer chill sectors, namely those determining the shape of the tread of the tire, are mounted in die sectors which are guided for radial displacement relative to the radially inner chill. Through the medium of crank-type links, the die sectors are articulated to an operating ring surrounding the die sectors and guided for angular displacement. Thus, upon angular displacement in one direction, the operating ring causes the die sectors, carrying the radially outer chill sectors, to move radially away from the inner chill and to diverge from each other in a circumferential direction. Upon movement of the operating ring in the opposite direction, the die sectors are moved radially inwardly to engage their respective chill sectors with the inner chill and to effect relative clamping of the outer chill sectors circumferentially. Upon such radially inward movement, the die sectors clampingly engage beveled peripheries of a lower die-support plate and an upper displaceable closure plate to clamp the lower base plate and the upper closure plate, as well as the upper and lower halves of the inner chill, against relative axial displacement.

The operating ring is advantageously cylindrical and is connected to each die sector with two relatively small coaxially interconnected crank links, spaced axially a distance equal to the axial thickness of the die sectors. In order to assure firm locking and clamping of the mold or die, radial reinforcing spurs may be provided on the die sectors, which spurs may also serve to effect firm interengagement of the lower base plate and the upper closure plate. Alternatively, other means forming outer projections to cooperate with corresponding inner projections of the operating ring, in the die closure position may be provided.

In order to assure the mutual forcing, to closure, of the chill sectors, even if there is some tolerance between the sectors, the spurs or other means adapted to form cooperating projections are provided with cam contours, for example, contours in the form of inclined planes or the like, to assure the radially inwardly forcing of the outer chill sectors during the last portion of the movement of the operating ring in a mold closing direction. Appropriate clearances, or tolerances, are provided in the linkages of the small crank links so as to provide forcing of the chill sectors inwardly about at the dead center position of the crank links. An inclined plane contour, or beveled surfaces, can be provided on inner projections of the operating ring to cooperate with the outer edges of the spurs on the die sectors.

A control and operating means for the operating ring, in the form of a hydraulic cylinder-piston actuator or the like, such as a corresponding mechanical actuator, may be provided to act tangentially on the operating ring for the movement of the latter in both angular directions. This control means, or preferably the operating ring, at the end of the opening stroke and, respectively, at the start of the opening stroke, is adapted to act on a toggle linkage to raise and, respectively, lower the closure plate which is supported by a hinged or pivoted arm.

Thus, the opening, closing, clamping and unclamping of the mold is effected by a very simple means, namely; the angularly displaceable operating ring and its associated operating or control means connected tangentially thereto.

An object of the invention is to provide an improved mold for the vulcanization, and especially for the retreading or regeneration, of vehicle tires.

Another object of the invention is to provide such a mold in which, during the molding, the mold opening and closing means are free of stress due to the molding operation.

A further object of the invention is to provide such a mold having a simple, rugged and highly effective means for opening and closing the mold.

For an understanding of the principles of the invention, reference is made to the following description of a typical embodiment thereof as illustrated in the accompanying drawings.

DESCRIPTION OF THE PREFERRED EMBODIMENT

Figure 1:
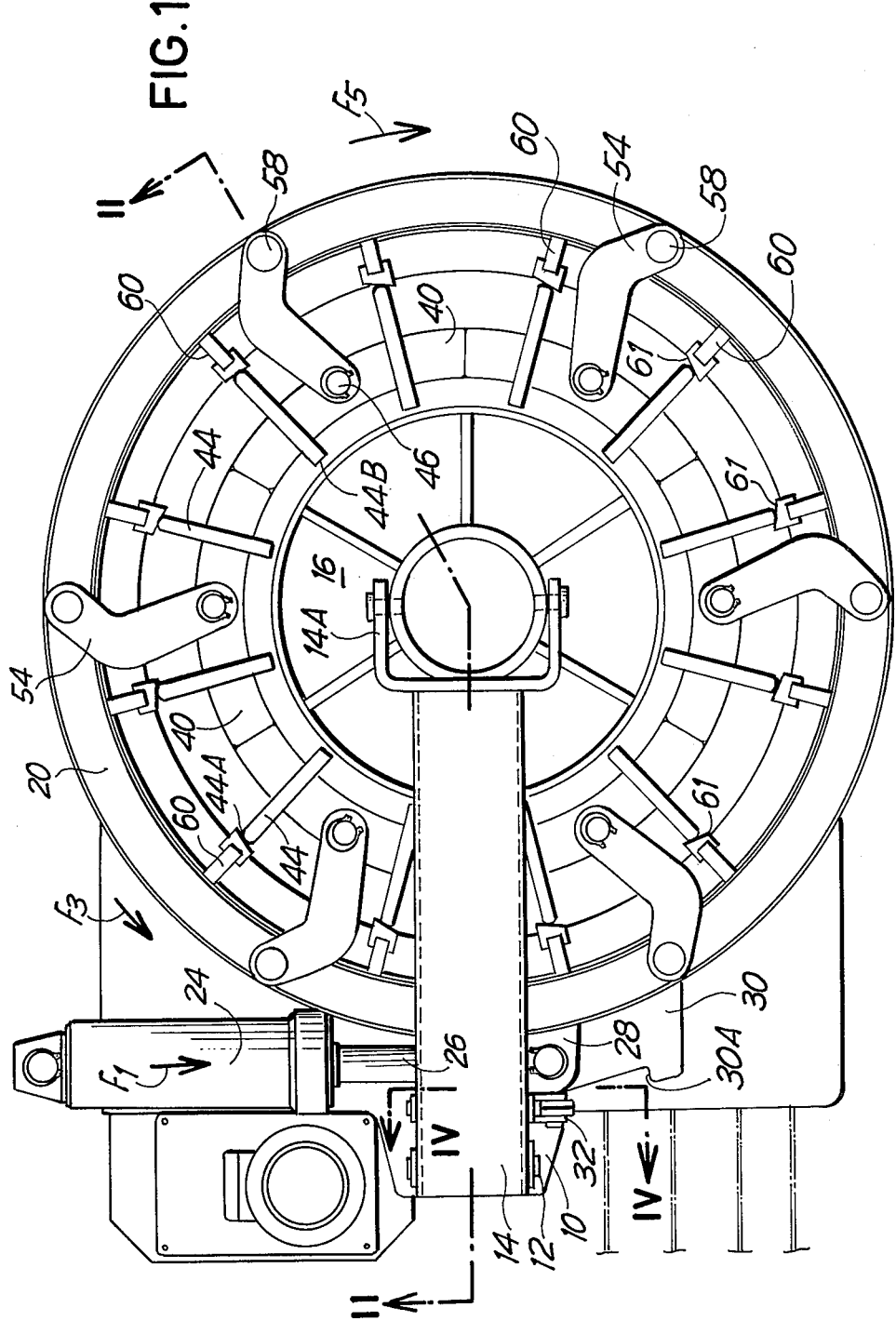
FIG. 1 is a plan view of a mold embodying the invention.

In the drawings, there is illustrated an embodiment of the invention in which the mold is horizontally oriented, but it should be understood that the principles of the invention are applicable equally to a vertically oriented mold or die arrangement.

Figure 2:
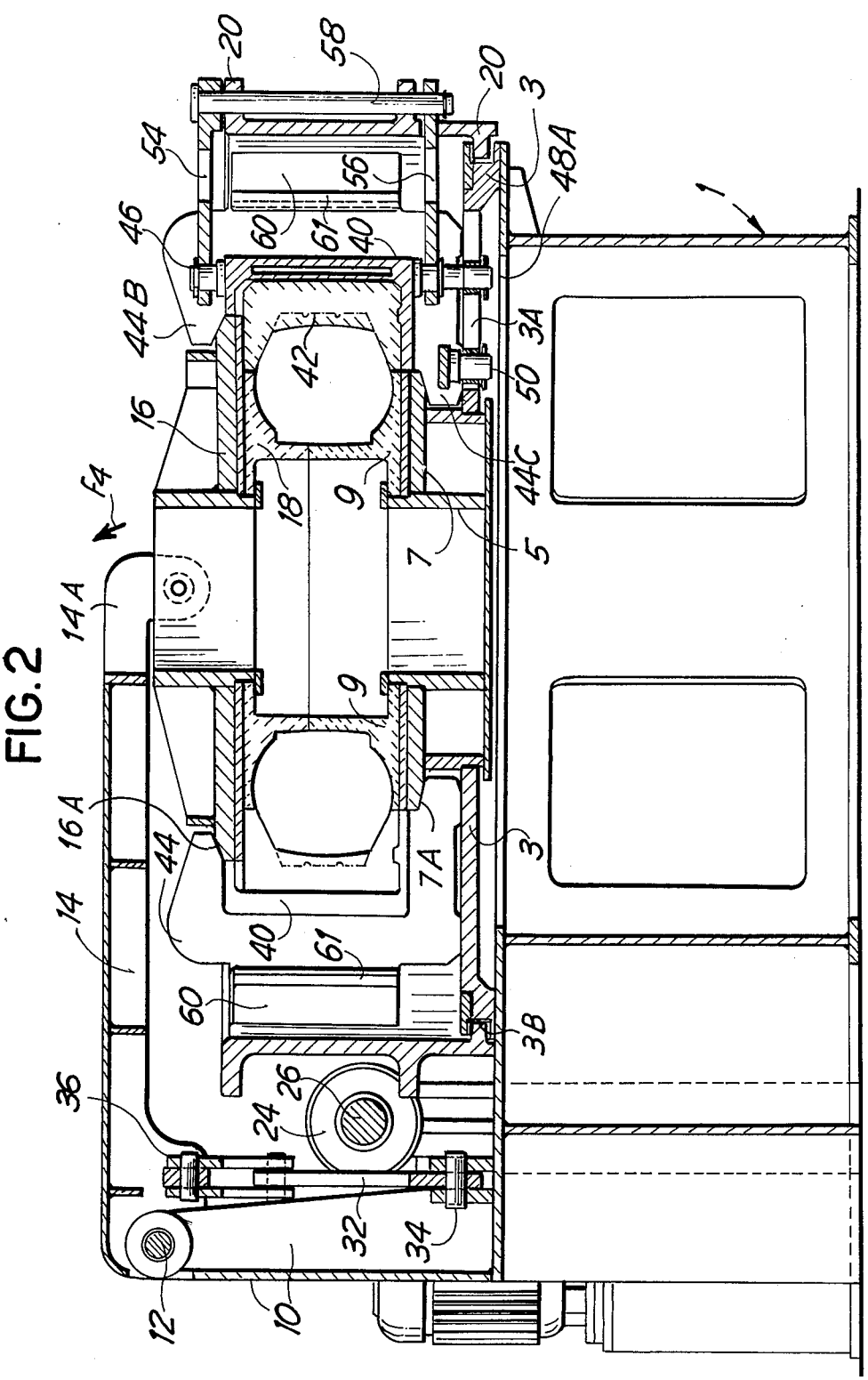
FIG. 2 is a sectional view of the mold, taken along the line II—II of FIG. 1, in two radial planes, with FIGS. 1 and 2 showing the mold closed.

Referring first to FIGS. 1 and 2, a generally cylindrical base 1 carries a circular annual support plate 3 having secured, to its inner periphery, a cylindrical support structure 5. Support structure 5 has secured thereto, preferably integrally therewith, a circular annular lower or base plate 7 carrying the lower half of an annular radially inner chill 9 designed to conform to the beads and inner flank portions of a vehicle tire to be treated for re-treading. The upper half of radially inner annular chill 9 is carried by an upper closure plate or disk 16, described more fully hereinafter. Support plate 3 is formed with equiangularly spaced radial slots 3A for guiding die sectors carrying respective radially outer chill sectors defining the outer peripheral chill portion of the mold, and thus the form of the tread to be regenerated. The die sectors 40, and thus the radially outer chill sectors 42 carried thereby, are thus radially displaceable inwardly and outwardly relative to the radially inner chill 9.

Base 1 carries an upwardly extending arm 10 pivotally supporting, at its upper end by a pivot 12, a radially inwardly extending arm 14 having, at its free outer end, a fork 14A pivotally connected to the upper disk-like annular closure plate 16 of the die. As mentioned, upper closure plate 16 carries the upper half 18 of the radially inner chill 9. The two halves 9 and 18 are symmetrical to each other and engageable with each other to define the innermost portion of the profile of the tire to be treated. Radial arm 14, and thus upper closure plate 16 carrying the upper half 18 of the radially inner chill, are pivotable about pivot 12 in a manner to be hereinafter described, during opening of the die or mold.

The lower base plate 7 and the upper closure plate 16 are formed, as best seen in FIG. 2, with opposite beveled peripheries 7A and 16A, respectively, for the purpose of clamping of the plates 7 and 16, against relative axial displacement, by means of the die sectors 40, as described more fully hereinafter.

Figure 4:
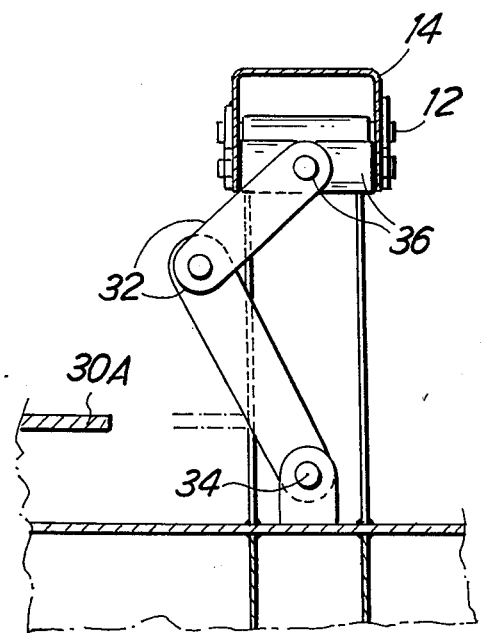
FIG. 4 is a sectional view taken along the line IV—IV of FIG. 1.
Figure 5:
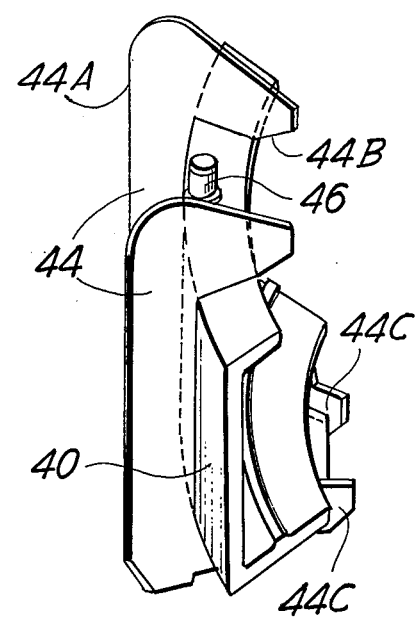
FIGS. 5 and 6 are, respectively, top and bottom perspective views of a die sector.
Figure 6:
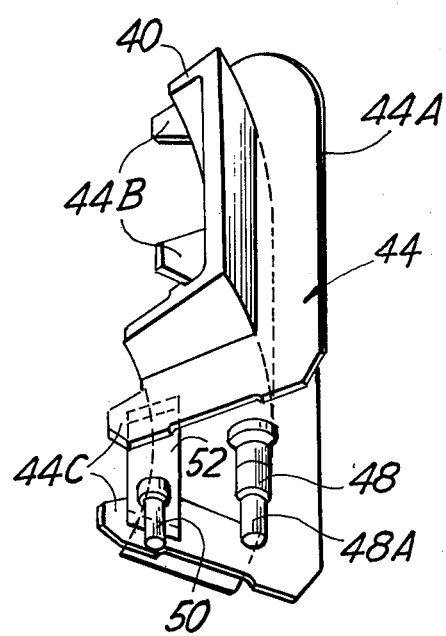

The outer periphery of support plate 3 is formed with a guide groove 3B for guiding a control or operating ring 20 for angular displacement relative to support plate 3. Operating ring 20 concentrically surrounds the mold or die, and has a generally cylindrical configuration. Such angular displacement of operating ring 20 effects opening and closing of the mold, by radial displacement of die sectors 40 with the radially outer chill sectors 42 and raising and lowering of closure plate 16 carrying the upper half 18 of the radially inner chill. For this purpose, operating ring 20 is provided with a suitable control and operating means, which may be either a mechanical means or a hydraulic means. In the particular embodiment of the invention illustrated in the drawings, a hydraulic ring control and operating means is provided in the form of a hydraulic linear actuator including a cylinder 24 connected to base 1 and a piston slideable therein and connected to a piston rod 26 whose outer end is pivotally connected to a wing or fin 28 projecting radially from the outer periphery of operating ring 20. Another wing or fin 30 projects from the outer periphery of operating ring 20, and is formed with a tooth 30A. Wing or fin 30, either alone or combination with wing or fin 28, acts on a toggle linkage 32, best seen in FIGS. 1, 2 and 4, which is pivotally connected, by a pivot 34, to base 1 and, by a pivot 36, to radial arm 14 at a point spaced somewhat inwardly from pivot 12.

Closure of the mold is effected with angular displacement of operating ring 20, by movement of piston rod 26 in the direction of the arrow f1 of the hydraulic actuator 24, 26, whereby ring 20 is displaced angularly in the direction indicated by the arrow f3. Such angular displacement of operating ring 20 results in inward displacement of the die sectors 40 carrying the radially outer chill sectors 42, so that these chill sectors engage the chills 9 and 18 to form a closed mold cavity. In the opening stroke of the operating ring 20, and after the initial displacement in a radially outward direction of the die sectors 40, as described more fully hereinafter, the tooth 30A of wing or fin 30 engages the toggle linkage 32, and straightens the toggle linkage. This effects raising of the radial arm 14 in the direction of the arrow f4 of FIG. 2, radial arm 14 pivoting about the pivot 12, and thus the upper closure plate 16 and the upper half 18 of the radially inner chill are moved upwardly to open the mold and particularly the mold cavity. At the start of the closure stroke of the hydraulic actuator 24, 26 in the direction f1, the weight of the radial arm 14 and of upper closure plate 16 and upper chill half 18 effects lowering of closure plate 16 in the closing direction, after which radially inward movement of die sectors 40, carrying the radially outer chill sectors 42, is effected simultaneously for closing the die cavity.

Each die sector 40 is an arcuate member which is generally channel-shaped in cross section, and carries a respective chill sector 42 which, in association with the chill sectors 42 carried by the other die sectors 40 and in association with the radially inner chills 9 and 18, completes the die or mold. In particular, chill sectors 42 present the tread impressions unless pre-pressed and pre-vulcanized materials are used. Each sector 40, in addition, has integral therewith a pair of arcuately spaced spurs 44 which also have a generally C-shaped cross section and resemble, to some extent, C-clamps with each spur 44 including a rear edge portion 44A and a pair of legs having respective inclined edges 44B and 44C, which are inclined oppositely to each other, the leg 44B being an upper leg and the leg 44C being a lower leg, in the embodiment illustrated in the drawings. A respective pin 46 extends upwardly from the upper surface of each die sector 40 and a respective pin 48 extends downwardly from from the lower surface thereof, the pins 46 and 48 being coaxial and the pin 48 having an extension 48A. A transverse member 52 interconnects the two spurs 44 of each die sector 40, and a pin 50 extends downwardly from each transverse member 52. Pins 50 and pin extensions 48A serve to guide the respective die sectors 40 in the corresponding slots 3A of the plate 3. However, guide systems other than that just specifically described could be provided for the die sectors 40.

Pins 46 and 48 constitute pivots for respective pairs of upper and lower bent links or cranks 54 and 56 whose opposite ends are pivotally connected coaxially to respective shafts 58 on operating and control ring 20. For a purpose to be described hereinafter, the bent links or cranks 54 and 56 have a limited clearance or tolerance.

Figure 7:
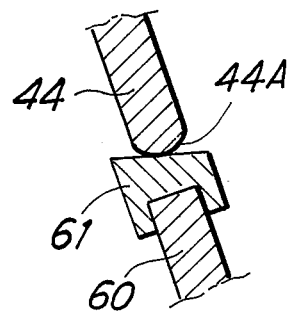
FIG. 7 is an enlarged sectional view illustrating a detail of FIG. 1.

Control and operating ring 20 is formed with inwardly extending projections 60 corresponding, in number, to the spurs 44 of die sectors 40. As best seen in the enlarged detail section shown in FIG. 7, either the inner edges of projections 60 may have an inclined plane contour or slope, or they may be provided with a cam 61, all for purposes described hereinafter.

When the control system 24, 26 has angularly displaced the operating ring 20 into the mold-closed position, cranks 54, 56 have acted on the die sectors 40 in such a manner as to move these die sectors radially inwardly into peripheral engagement with each other, the die sectors 40 being guided by the respective guide slots 3A during this movement and through the medium of the pins 50 and the pin extensions 48A. The arrangement of cranks 54, in the mold-closed position of ring 20, is substantially that of a dead center point with a substantially radial alignment of the bent links or cranks 46, 48 with the respective pivot shafts 58. Under these conditions the inclined profiles or cam contours 61 of projections 60 are forcibly engaged with the radially outer edges 44A of the spurs 44, so that the die sectors 40 are forced, utilizing the clearances provided by the crank linkages, to close the mold and to resist the mold inner pressures which tend to move the die sectors carrying the chills 42, radially outwardly and circumferentially away from each other.

Figure 3:
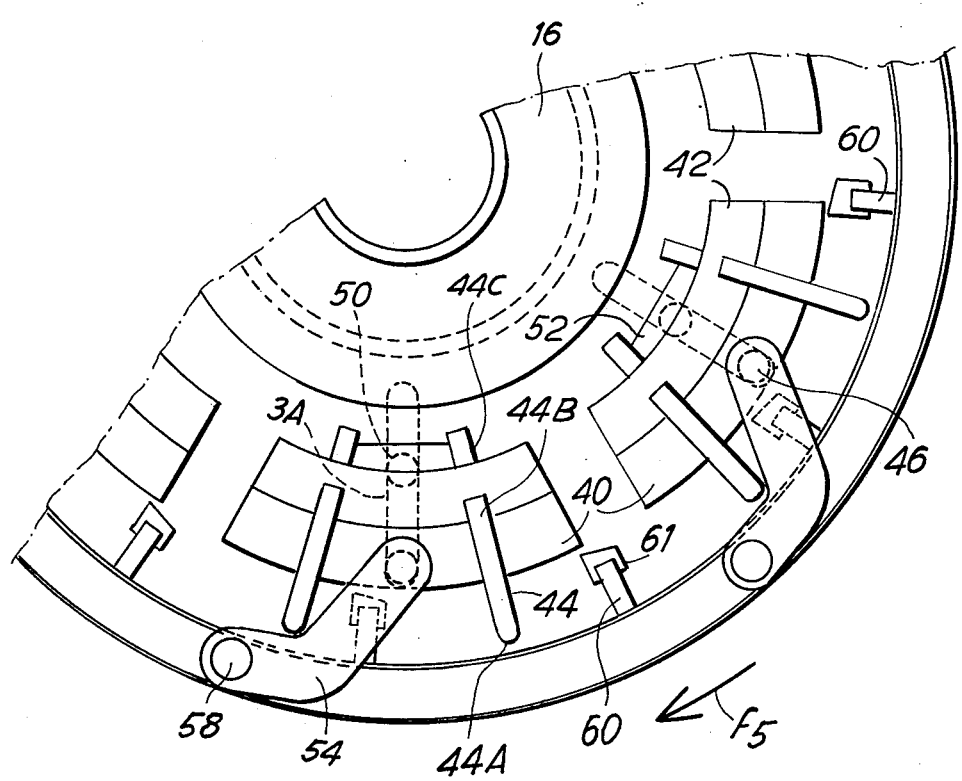
FIG. 3 is a partial plan view, similar to FIG. 1, but showing the mold in the nearly open position of the chill sectors.

When the operating system 24, 26 is operated in a direction opposite to the directions indicated by the arrows *f*1 and *f*3, operating ring 20 is angularly displaced in the opening direction indicated by the arrow *f*5, and this effects a displacement of the cams 61 of the projections 60 relative to the spurs 44 and, moreover, an entraining effect in the radially outward direction, of the die sectors through the action of the cranks 54, 56. Consequently, there is a displacement of the die sectors 40 from the arrangement shown in FIG. 1 to that shown in FIG. 3. In the last portion of the angular displacement of operating ring 20, and of the radially outward movement of the die sectors 40, tooth 30A of fin or wing 30 engages the toggle linkage 32 to straighten the same and thus lift the arm 14 carrying the upper closure plate or cover 16 of the mold, which has already been disengaged by the spurs 44B of the die sectors 40. Thus, the upper chills 18 are disengaged from the lower chills 9, with the chills 42 being retracted radially outwardly, so that the mold is now opened.

It should be noted that the wedge-shaped ends 44B and 44C of the spurs 44 of die sectors 40, at the end of the radially inward closing stroke of the die sectors, carrying respective chills 42, engage the chamfered or beveled peripheries of the plates 7 and 16 to assure, in this manner, the clamping closure of the central zone of the die, that is, the mating of the chills 9 and 18 with the chills 42 of the die or mold. At the start of the diverging or radially outward movement of the dies 40, the wedge ends 44B and 44C of the spurs 44 disengage the beveled or chamfered peripheries of 7A and 16A of the base plate 7 and the closure plate 16, respectively, so that plates 7 and 16 are released whereby the raising of closure plate 16, through the arm 14, by the toggle mechanism 32, is made possible. Instead of the spurs 44, there could also be provided a continuous edge system for clamping closed the plates 7 and 16.

The described mold is particularly simple and has few parts, allows easy operation, and an operational positiveness for the sequence of the movements, which are provided by the single operating system. The machine is particularly economic with respect to its manufacture.

While a specific embodiment of the invention has been shown and described in detail to illustrate the application of the principles of the invention, it will be understood that the invention may be embodied otherwise without departing from such principles. For example, the toggle linkage 32 can be replaced by a cylinder-piston system or the like. It should further be noted that the machine can re-tread not only tires with the air chamber system, but also tires without the air chamber and with an inner heating.

I claim:

1. A pneumatic tire mold, comprising, in combination, a lower disc-like plate; an upper disc-like plate; an inner chill disposed between said plates to define the inner periphery of a tire-receiving mold cavity; a plurality of outer chill sectors matingly engageable with each other and with said inner chill to define the outer periphery of the mold cavity; means mounting said upper plate for movement relative to said outer chill sectors to open the mold; means mounting said outer chill sectors for guided radial movement relative to said inner chill; an angularly displaceable, axially fixed operating ring surrounding said outer chill sectors; respective linkages connecting each outer chill sector mounting means to said operating ring and operable, responsive to angular displacement of said operating ring, to move said outer chill sectors radially relative to said inner chill; ring operating control means connected to said operating ring to angularly displace said operating ring; cooperating abutment means on said operating ring and said outer chill sector mounting means interengageable, when the mold cavity is closed, to resist radial stresses on said outer chill sectors; said cooperating abutment means comprising at least an inclined surface acting as a wedge; and clamping means engageable with said lower and upper disc-like plates, responsive to angular displacement of said operating ring effecting radial movement of said outer chill sectors into engagement with said inner chill, to clamp said plates to resist axial stresses thereon; whereby, during the tire molding operation, no radial stresses are exerted on said linkages and no axial stresses are exerted on said upper plate mounting means.

2. A pneumatic tire mold, as claimed in claim 1, wherein such linkages comprise respective cranks pivotally connected to the associated outer chill sector mounting means and to said operating ring.

3. A pneumatic tire mold, as claimed in claim 2, including two respective cranks connecting each outer chill sector mounting means to said operating ring, the two cranks being spaced axially from each other and being pivoted coaxially to the associated outer chill sector mounting means and to said operating ring.

4. A pneumatic tire mold, as claimed in claim 3, including a support plate concentric with and fixed relative to said lower plate; said means mounting said outer chill sectors for guided radial movement comprising respective radial slots in said support plate; each outer chill sector mounting means including a pin engaged in the associated radial slot with the associated pivot connecting the two cranks to the respective outer chill sector mounting means having an extension guided in the respective radial slot.

5. A pneumatic tire mold, as claimed in claim 1, in which said cooperating abutment means comprises a respective radially outwardly extending projection on each outer chill sector mounting means and an associated radially inwardly extending projection on said operating ring; said projections being radially aligned responsive to angular displacement of said operating ring to close the mold cavity, and being moved out of alignment responsive to angular displacement of said operating ring to move said outer chill sectors radially outwardly.

6. A mold as claimed in claim 1, wherein the ring operating control means act in a tangential direction on said operating ring for the displacement thereof in both angular directions.

7. A pneumatic tire mold, as claimed in claim 7, including a further linkage operable to open and close said upper plate; and means operable by one of said ring operating control means and said operating ring to operate said further linkage to open said upper plate toward the end of the mold cavity opening movement of said outer chill sectors and to close said upper plate at the start of the mold cavity closing movement of said outer chill sectors.

8. A pneumatic tire mold, as claimed in claim 6, including means operable, in timed relation with the movement of said operating ring, to effect opening and closing of said upper plate.

9. A pneumatic tire mold, as claimed in claim 1, in which said inner chill comprises mating upper and lower chill halves; said lower chill half being mounted on said lower disc-like plate, and said upper chill half being mounted on said upper disc-like plate for movement with the latter.

10. A pneumatic tire mold, as claimed in claim 1, in which said lower disc-like plate and said upper disc-like plate are formed with oppositely chamfered external peripheries: said means mounting said outer chill sectors comprising respective die sectors including C-shape radially oriented spur means opening toward said lower and upper disc-like plates and having inclined surfaces engageable with the chamfered peripheries of said lower and upper disc-like plates; said spur means constituting said clamping means engageable with said lower and upper disc-like plates.

* * * * *